| United States Patent [19] | [11] 3,930,024 |
| --- | --- |
| Creger | [45] Dec. 30, 1975 |

[54] PHARMACEUTICAL COMPOSITIONS AND METHODS

[75] Inventor: Paul L. Creger, Ann Arbor, Mich.

[73] Assignee: Parke, Davis & Company, Detroit, Mich.

[22] Filed: Nov. 27, 1974

[21] Appl. No.: 527,934

Related U.S. Application Data

[63] Continuation-in-part of Ser. No. 193,215, Oct. 27, 1971, abandoned, which is a continuation-in-part of Ser. No. 854,757, Sept. 2, 1969, abandoned.

[52] U.S. Cl. ............... 424/343; 424/212; 424/309; 424/312; 424/313
[51] Int. Cl.² .................................. A61K 31/045
[58] Field of Search ........... 424/311, 313, 312, 339, 424/225, 343, 309, 212

[56] References Cited
UNITED STATES PATENTS
3,210,404  10/1965  Durr, Jr. et al. ..................... 260/635

FOREIGN PATENTS OR APPLICATIONS
1,000,787  8/1965  United Kingdom ................. 260/635

OTHER PUBLICATIONS

Chemical Abstracts, (1962), Vol. 57, 13613.

*Primary Examiner*—Frederick E. Waddell

[57] ABSTRACT

Pharmaceutical compositions comprising a pharmaceutical carrier and a $\beta,\beta,\beta',\beta'$-tetramethylalkanediol having a total of 14 to 18 carbon atoms, or an ester of such an alkanediol. Methods for the lowering of serum triglyceride and cholesterol levels by administering a $\beta,\beta,\beta',\beta'$-tetramethylalkanediol having a total of 14 to 18 carbon atoms, or an ester of such an alkanediol.

11 Claims, No Drawings

PHARMACEUTICAL COMPOSITIONS AND METHODS

CROSS REFERENCE TO RELATED APPLICATION

This is a continuation-in-part of co-pending application Ser. No. 193,215, filed Oct. 27, 1971 now abandoned, which is a continuation-in-part of application Ser. No. 854,757, filed Sept. 2, 1969, now abandoned.

SUMMARY AND DETAILED DESCRIPTION

The present invention relates to pharmaceutical compositions possessing serum triglyceride-lowering activity, serum cholesterol lowering activity and to methods for lowering serum triglyceride levels and serum cholesterol levels.

More particularly, the invention relates to pharmaceutical compositions and methods employing compounds which can be represented by the formula

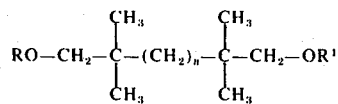

in which $n$ represents 6, 7, 8, 9, or 10; and each of R and $R^1$ represents hydrogen, and acyl radical of a hydrocarbon monocarboxylic acid containing 1 to 12 carbon atoms, an acyl radical of a hydrocarbon dicarboxylic acid containing 4 to 6 carbon atoms, phenylalanyl, or phosphono,

The terms "acyl radical of a hydrocarbon dicarboxylic acid" and "phosphono" as used herein include such radicals in both free acid and cationic salt forms. The term "phenylalanyl" as used herein includes such radical in both free base and acid-addition salt forms. Some typical examples of pharmaceutically-acceptable cationic salt forms are the sodium, potassium, calcium, ammonium, and amine salts. Some typical examples of pharmaceutically-acceptable acid-addition salt forms are the hydrochloride, sulfate, phosphate, citrate, and maleate salts.

In accordance with the invention, pharmaceutical compositions are produced by formulating a compound of the foregoing formula (as an active ingredient) in dosage unit form with a pharmaceutical carrier. Some examples of dosage unit forms are tablets, capsules, lozenges, and pills; as well as powders and aqueous and non-aqueous solutions and suspensions packaged in containers containing either one or some larger number of dosage units and capable of being subdivided into individual doses by such means as measurement into a teaspoon or other standard container. Some examples of suitable pharmaceutical carriers, including pharmaceutical diluents, are gelatin capsules; sugars such as lactose and sucrose; starches such as corn starch and potato starch; cellulose derivatives such as sodium carboxymethyl cellulose, ethyl cellulose, methyl cellulose, and cellulose acetate phthalate; gelatin; talc; stearic acid; magnesium stearate; vegetable oils such as peanut oil, cottonseed oil, sesame oil, olive oil, corn oil, and oil of theobroma; propylene glycol; glycerine, sorbitol; polyethylene glycol; water; agar; alginic acid; isotonic saline; and phosphate buffer solutions; as well as other compatible substances normally used in pharmaceutical formulations. The compositions of the invention can also contain other components such as coloring agents, flavoring agents, and/or preservatives. These materials, if present, are usually used in relatively small amounts. The compositions can, if desired, also contain other therapeutic agents.

The percentage of the active ingredient in the foregoing compositions can be varied within wide limits but for practical purposes it is preferably present in a concentration of at least 10% in a solid composition and at least 2% in a primarily liquid composition. The most satisfactory compositions are those in which a much higher proportion of the active ingredient is present. The compositions of the invention preferably contain from 20 to 1,000 mg. of the active ingredient per dosage unit so that the entire amount to be administered during a day can be made up from a reasonable number of dosage units.

Also, in accordance with the invention, the compounds of the foregoing formula are administered for the purpose of lowering serum triglyceride levels and/or lowering serum cholesterol levels. The aforementioned compounds and compositions containing the same can be administered either orally or parenterally, in dosage unit form, with the dose adjusted to the needs and tolerances of the individual patient. Oral administration is preferred. The usual human dosage range is from 50 to 5,000 mg. per day, and while 50 to 2,000 mg./day may be employed, preferably 1,000 to 5,000 mg. per day, in divided portions. Treatment is continued while satisfactory control of the serum triglyceride level and/or serum cholesterol level is maintained without undesired side-effects.

The methods of the invention, as explained above, produce a lowering of the serum triglyceride level and/or serum cholesterol level.

The effectiveness of the aforementioned compounds and compositions in lowering serum triglycerides can be demonstrated by standard methods. For example, male rats weighing 200–250 g. are maintained on a normal pellet diet. Each animal in a treatment group is given a daily oral dose of a test compound for 7 days. An untreated control group is also maintained. At the end of the 7-day test period the animals are weighed and sacrificed, and the serum cholesterol and serum triglycerides are determined from blood samples taken from the vena cava. The methods used are described in "Journal of Laboratory and Clinical Medicine", 50, 318 (1957) and "Journal of Laboratory and Clinical Medicine", 50, 152 (1957). The test compound is considered to exhibit a side effect if the weight of the animals in the treatment group is significantly less than the weight of the animals in the control group. In a representative determination, 2,2,9,9-tetramethyl-1,10-decanediol at 10 mg./kg. per day for 7 days produced a 51% reduction of serium triglycerides with no effect on serum cholesterol or weight of the animals, relative to the untreated control group. 2,2,10,10-Tetramethyl-1,11-undecanediol at 25 mg./kg. per day for 7 days produced a 47 % reduction of serum triglycerides with no effect on serum cholesterol or weight of the animals, relative to the untreated control group. 2,2,13,13-Tetramethyl-1,14-tetradecanediol at 125 mg./kg. per day for 7 days produced a 77% reduction of serum triglycerides and a 23% reduction of serum cholesterol, with no effect on weight of the animals, relative to the untreated control group. Its diacetate ester at 147 mg./kg. per day for 7 days produced a 69% reduction of serum triglycerides and a 27% reduction of serum cholesterol, with no effect on weight of the animals, relative to the untreated control group.

The effectiveness of the compounds of this invention in lowering serum cholesterol and lowering serum triglycerides is demonstrated by tests on seven human patients, two having Type IV hyperlipoproteinemia (elevated serum triglyceride levels with or without elevated serum cholesterol levels) and five having Type II hyperlipoproteinemia (elevated serum cholesterol levels with or without elevated serum triglyceride levels) using 2,2,9,9-tetramethyl-1,10-decanediol. The compound was administered initially at 400 mg./day in two divided doses (four subjects) or 1,200 mg./day (three subjects) and at approximately one week intervals raised 400 mg./day until a maximum of 1,600 or 2,000 mg./day was reached.

The following table gives the results of administration of a preferred dosage of 2,2,9,9-tetramethyl-1,10-decanediol.

aluminum chloride in an anhydrous ethereal solvent, followed by hydrolyzing the reaction mixture. When $R^2$ represents lower alkyl, other reducing agents can also be used such as sodium borohydride in aqueous ethanol.

The esters employed in the practice of the invention, specifically the compounds wherein R and $R^1$ can represent acyl radicals of hydrocarbon monocarboxylic acids containing 1 to 12 carbon atoms, acyl radicals of hydrocarbon dicarboxylic acids containing 4 to 6 carbon atoms, phenylalanyl, or phosphono, can be prepared by reacting the $\beta,\beta,\beta',\beta'$-tetramethylalkanediol with an acid or a reactive derivative thereof such as an acid anhydride or an acid halide. Representative of such acids and reactive derivatives are acetic acid, acetic anhydride, acetyl chloride, propionic anhydride, valeric anhydride, lauroyl chloride, succinic anhydride, maleic anhydride, glutaric anhydride, adipic anhydride, adamantane-1-carboxylic acid, benzoic acid, L-phenylalanyl chloride hydrochloride, and phosphoric acid. Reaction conditions normally employed is esterification reactions are utilized, as illustrated in greater detail hereinafter. Of the various esters mentioned

| Type | Patient No. | S. CHOLESTEROL mg % | | | S. TRIGLYCERIDES mg % | | CI-720 |
|------|-------------|---------------------|-----------|----------------|-----------------------|-----------|----------------|
|      |             | Pre-treatment | Max. % Change | Dose mg/day | Pre-treatment | Max. % Change | Dose mg/day |
| IV   | 1 | 372.8 | −42% | 2000 | 714.2 | −80 | 2000 |
|      | 2 | 207*  | −12  | 2000 | 294.8 | −47 | 2000 |
| II   | 3 | 343   | −34  | 1200 | 143*  | −24 | 2000 |
|      | 4 | 301   | −12  | 2000 | 100.4*| −22 | 1600 |
|      | 5 | 277   | −27  | 1600 | 127.2*| − 7 | 1600 |
|      | 6 | 305.4 | −12**| 2000 | 170.2 | −26 | 2000 |
|      | 7 | 305.2 | −28  | 2000 | 134.4*| −56 | 2000 |

*Normal Cholesterol Level
**At 2 weeks

The preferred pharmaceutical compositions and methods of the invention are those employing a $\beta,\beta,\beta',\beta'$-tetramethylalkanediol of the formula

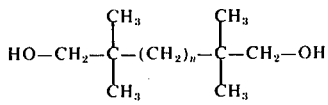

where n is as defined before and consequently represents 6, 7, 8, 9, or 10.

Some of the compounds employed in the compositions and methods of the invention are old. They can all be prepared in a number of different ways. For example, the $\beta,\beta,\beta',\beta'$-tetramethylalkanediols can be obtained by reducing a dicarboxylic acid or ester of the formula reactive

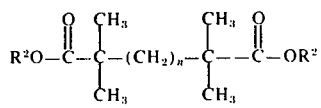

where n is as defined before and $R^2$ represents hydrogen or lower alkyl. The reduction is usually carried out by reacting the acid or ester with a complex metal hydride such as lithium aluminum hydride, lithium aluminum hydride-aluminum chloride, aluminum hydride-aluminum chloride, or sodium borohydride-above, the esters in which the acyl radical is the acyl radical of an alkanoic acid or an alkanedioic acid are preferred in the practice of the invention.

In another method, applicable when $R^2$ represents phosphono, the $\beta,\beta,\beta',\beta'$-tetramethylalkanediol is first reacted with diphenylphosphorochloridate, $(C_6H_5O)_2$-POCl, in pyridine. The resulting diphenylphosphoric acid diester is then subjected to hydrogenolysis with platinum oxide catalyst in a lower alkanoic acid or a lower alkanol whereby the phenoxy groups are hydrogenolyzed to hydroxy groups.

The invention is illustrated by the following examples.

EXAMPLE 1

| Ingredient | Quantity |
|------------|----------|
| 2,2,9,9-Tetramethyl-1,10-decanediol | 1,000 g. |
| Lactose | 960 g. |
| Magnesium Stearate | 40 g. |

The mixture is blended in a twin-shell blender and filled into No. 4 hard gelatin capsules. Each capsule is filled with 200 mg. of the powder mixture and contains 100 mg. of 2,2,9,9-tetramethyl-1,10-decanediol. Yield equals approximately 10,000 capsules.

EXAMPLE 2

| Ingredient | Quantity |
| --- | --- |
| 2,2,10,10-Tetramethyl-1,11-undecanediol | 1,000 g. |
| Lactose | 960 g. |
| Magnesium Stearate | 40 g. |

The mixture is blended and filled into No. 4 hard gelatin capsules, filling each capsule with 200 mg. of the powder mixture. Yield equals approximately 10,000 capsules, each containing 100 mg. of 2,2,10,10-tetramethyl-1,11-undecanediol.

Similarly, filled gelatin capsules are obtained by substituting 1,000 g. of any of the following substances for the 2,2,10,10-tetramethyl-1,11-undecanediol in the foregoing procedure:

Phosphoric acid, diester with 2,2,9,9-tetramethyl-1,10-decanediol.
Succinic acid, 1,1'-diester with 2,2,9,9-tetramethyl-1,10-decanediol.
Adipic acid, 1,1'-diester with 2,2,9,9-tetramethyl-1,10-decanediol.
1-Adamantanecarboxylic acid, diester with 2,2,9,9-tetramethyl-1,10-decanediol.
3-Phenyl-L-alanine, diester with 2,2,9,9-tetramethyl-1,10-decanediol, dihydrochloride.

EXAMPLE 3

| Ingredient | Quantity |
| --- | --- |
| 2,2,9,9-Tetramethyl-1,10-decanediol | 1,000 g. |
| Lactose | 800 g. |
| Magnesium Stearate | 35 g. |

The mixture is blended and filled into No. 3 hard gelatin capsules, filling each capsule with 367 mg. of the powder mixture. Yield equals approximately 5,000 capsules, each containing 200 mg. of 2,2,9,9-tetramethyl-1,10-decanediol.

EXAMPLE 4

| Ingredient | Quantity |
| --- | --- |
| 2,2,9,9-Tetramethyl-1,10-decanediol | 1,000 g. |
| Polyethylene Glycol | 1,000 g. |

The polyethylene glycol used in this formulation can be a material such as polyethylene glycol 400. The above ingredients are blended and filled into soft gelatin capsules, filling each capsule with 400 mg. of the mixture. Yield equals approximately 5,000 capsules, each containing 200 mg. of 2,2,9,9-tetramethyl-1,10-decanediol.

Similarly, filled soft gelatin capsules are obtained by substituting 1,000 g. of any of the following substances for the 2,2,9,9-tetramethyl-1,10-decanediol in the foregoing procedure:

2,2,9,9-Tetramethyl-1,10-decanediol, diacetate ester.
2,2,9,9-Tetramethyl-1,10-decanediol, dipropionate ester.
2,2,9,9-Tetramethyl-1,10-decanediol, dibenzoate ester.
2,2,13,13-Tetramethyl-1,14-tetradecanediol, diacetate ester.

EXAMPLE 5

| Ingredient | Quantity |
| --- | --- |
| 2,2,9,9-Tetramethyl-1,10-decanediol | 3,000 g. |
| Lactose | 750 g. |
| Corn Starch | 300 g. |
| Gelatin | 120 g. |
| Water | 1,000 cc. |
| Magnesium Stearate | 20 g. |

The 2,2,9,9-tetramethyl-1,10-decanediol, lactose, and 150 g. of the corn starch are blended and granulated with a solution of the gelatin in the water. The wet granulation is screened, dried, and re-screened. The resulting dried granulation is blended with the magnesium stearate and the remaining 150 g. of corn starch, and the mixture is compressed into 698 mg. tablets using 15/32 inch standard concave punches. Yield equals approximately 6,000 tablets, each containing 500 mg. of 2,2,9,9-tetramethyl-1,10-decanediol.

EXAMPLE 6

| Ingredient | Quantity |
| --- | --- |
| 2,2,9,9-Tetramethyl-1,10-decanediol (micronized) | 4 g. |
| Polyoxyethylene Sorbitan Monostearate | 0.1 cc. |
| Sodium Carboxymethyl Cellulose | 0.3 g. |
| Complex Magnesium-Aluminum Silicate | 0.5 g. |
| Sugar | 10 g. |
| Glycerin | 2 cc. |
| Sodium Benzoate | 0.5 g. |
| Sodium Citrate | 0.2 g. |
| Approved Red Dye | 1 mg. |
| Imitation Cherry Flavor | 0.02 cc. |
| Citric Acid, to make pH 5.0 | |
| Distilled Water, to make 100 cc. | |

The polyoxyethylene sorbitan monostearate can be a product such as polysorbate 60 or Tween 60. The complex magnesium-aluminum silicate is a gel-forming agent. A product such as Veegum H.V. can be used. This substance is hydrated overnight in 10 cc. of distilled water. A mixture is prepared from the polyoxyethylene sorbitan monostearate, imitation cherry flavor, 30 cc. of distilled water, and the 2,2,9,9-tetramethyl-1,10-decanediol and passed through a homogenizer. With vigorous stirring, the sugar, glycerin, sodium citrate, sodium benzoate, and sodium carboxymethyl cellulose are added, followed by hydrated complex magnesium-aluminum silicate and a solution of the red dye in 2 cc. of water. The resulting suspension is homogenized, adjusted to pH 5.0 with citric acid, and diluted to a final volume of 100 cc. with distilled water. A 5 cc. oral dosage unit of this suspension contains 200 mg. of 2,2,9,9-tetramethyl-1,10-decanediol. If desired, the red dye and imitation cherry flavor can be omitted or replaced by other coloring and flavoring agents.

By the foregoing procedure, with the substitution of 4 g. of micronized 2,2,13,13-tetramethyl-1,14-tetradecanediol for the 2,2,9,9-tetramethyl-1,10-decanediol, a suspension containing 200 mg. of 2,2,13,13-tetramethyl-1,14-tetradecanediol per 5 cc. oral dosage unit is obtained.

EXAMPLE 7

| Ingredient | Quantity |
| --- | --- |
| 2,2,9,9-Tetramethyl-1,10-decanediol (micronized) | 20 g. |
| Sodium Phosphate Monobasic | 0.9 g. |
| Sodium Phosphate Dibasic | 0.2 g. |
| Benzethonium Chloride | 0.02 g. |
| Hydrochloric Acid, to make pH 6.0 | |
| Sterile Distilled Water, to make 200 cc. | |

The sodium phosphate monobasic, sodium phosphate dibasic, and benzethonium chloride are dissolved in 140 cc. of distilled water. The pH is adjusted to 6.0 with hydrochloric acid and the solution is sterilized by filtration using a sterilized millipore filter membrane and a microfiber glass pre-filter disc. Equipment suitable for this purpose is a type SS (0.22 micron pore size) millipore filter membrane and a type AP-20 microfiber glass pre-filter disc. The 2,2,9,9-tetramethyl-1,10-decanediol is sterilized with ethylene oxide and mixed thoroughly with the sterilized solution, which is then diluted with sterilized distilled water to a final volume of 200 cc. The resulting suspension is passed through a sterilized 100 mesh screen and aseptically filled into round amber glass vials, filling each vial with 2 cc. of the suspension. Each vial is stoppered with a rubber closure and sealed with an aluminun cap. The resulting suspension for parenteral administration contains 100 mg. of 2,2,9,9-tetramethyl-1,10-decanediol per cc.

Preparation of Tetramethylalkanediols and Esters

A. With stirring at room tempertuare, 25.8 g. of 2,2,9,9-tetramethyldecanedioic acid in 175 ml. of dry tetrahydrofuran is added over a period of 20 minutes to a slurry of 8.6 g. of lithium aluminum hydride and 400 ml. of dry ether. The mixture is heated at reflux for 2 hours, treated successively with 8.6 ml. of water, 8.6 ml. of 15% sodium hydroxide solution, and 17.2 ml. of water, and filtered. The filtrate is concentrated to a small volume to give 2,2,9,9-tetramethyl-1,10-decanediol; m.p. 61°–62° C. following crystallization from acetonitrile.

B. A solution of 51.7 g. of 2,2,9,9-tetramethyldecanedioic acid, 1.0 g. of p-toluenesulfonic acid monohydrate, 100 ml. of absolute ethanol, and 500 ml. of toluene is heated at reflux for 25 hours, with continuous removal of the water formed in the reaction. The solution is cooled, washed with dilute sodium bicarbonate solution and with water, dried, and concentrated to give a residue of 2,2,9,9-tetramethyldecanedioic acid, diethyl ester. The product can be purified by distillation in vacuo; b.p. 134°–136° C. at 1.0 mm. By substituting 31.6 g. of this product for the 2,2,9,9-tetramethyldecanedioic acid in procedure (A), there is obtained 2,2,9,9-tetramethyl-1,10-decanediol; m.p. 63°–64° C. following crystallization from acetonitrile.

C. A solution of 15 g. of 2,2,10,10-tetramethyl-1,11-undecanedioic acid in 120 ml. of tetrahydrofuran is reacted with 4.7 g. of lithium aluminum hydride in 150 ml. of ether and the product isolated as in procedure (A). The product is 2,2,10,10-tetramethyl-1,11-undecanediol; m.p. 51°–53.5° C. following recrystallization from acetonitrile.

D. A solution of 29.9 g. of 2,2,13,13-tetramethyl-1,14-tetradecanedioic acid in 250 ml. of tetrahydrofuran is reacted with 8.1 g. of lithium aluminum hydride in 600 ml. of ether and the product isolated as in procedure (A). The product is 2,2,13,13-tetramethyl-1,14-tetradecanediol; m.p. 57°–58° C. following crystallization from acetonitrile.

E. A mixture of 17.2 g. of 2,2,9,9-tetramethyl-1,10-decanediol and 56 ml. of acetic anhydride is heated at reflux for 2 hours, cooled, diluted with 250 ml. of water, and stirred overnight. The aqueous mixture is extracted with ether and the extract is washed with dilute sodium hydroxide solution, dried over magnesium sulfate, and concentrated to give an oily residue of 2,2,9,9-tetramethyl-1,10-decanediol, diacetate ester; b.p. 135°–137° C. at 0.6 mm. By substituting an equivalent amount of propionic anhydride for the acetic anhydride, the product is 2,2,9,9-tetramethyl-1,10-decanediol, dipropionate ester.

F. A mixture of 13.4 g. of 2,2,13,13-tetramethyl-1,14-tetradecanediol and 24 g. of acetic anhydride is heated at reflux for 2 hours, cooled, diluted with 250 ml. of water, and stirred for 2 hours. The aqueous mixture is extracted with hexane and the extract is washed with dilute sodium hydroxide solution, dried over magnesium sulfate, and concentrated to give an oily residue of 2,2,13,13-tetramethyl-1,14-tetradecanediol, diacetate ester; b.p. 170°–172° C. at 0.5 mm.

G. A mixture of 23 g. of 2,2,9,9-tetramethyl-1,10-decanediol, 29.3 g. of benzoic acid, 1.5 g. of p-toluenesulfonic acid monohydrate, and 260 ml. of toluene is heated at reflux for 18 hours with continuous removal of the water formed in the reaction. The mixture is cooled, diluted with ether, and washed with dilute sodium hydroxide solution and with water. The organic phase is dried over magnesium sulfate and concentrated to give an oily residue of 2,2,9,9-tetramethyl-1,10-decanediol, dibenzoate ester; b.p. 217°–220° C. at 0.4 mm.

H. A mixture of 6.9 g. of 2,2,9,9-tetramethyl-1,10-decanediol, 6.0 g. of succinic anhydride, and 60 ml. of ethyl acetate is added dropwise to a solution of 8.3 ml. of triethylamine in 12 ml. of ethyl acetate over a period of 1¼ hours. The mixture is stirred at 70° C. for 2 hours, diluted with additional ethyl acetate, and washed with 60 ml. of 1 N sulfuric acid and with 50 ml. of 10% sodium sulfate solution. The organic phase is dried over magnesium sulfate and concentrated to give a residue of succinic acid, 1,1'-diester with 2,2,9,9-tetramethyl-1,10-decanediol; m.p. 72°–74° C. following crystallizations from acetonitrile and from ether-hexane. The disodium salt is obtained by dissolving 3.5 g. of the above product and 1.4 g. of sodium bicarbonate in 100 ml. of water and freeze drying. By substituting an equivalent amount of adipic anhydride for the succinic anhydride, the product is adipic acid, 1,1'-diester with 2,2,9,9-tetramethyl-1,10-decanediol. The disodium salt is prepared by reaction with sodium bicarbonate.

I. A mixture of 2.3 g. of 2,2,9,9-tetramethyl-1,10-decanediol, 4.5 g. of adamantane-1-carboxylic acid, 0.5 g. of p-toluenesulfonic acid, and 25 ml. of toluene is heated at reflux for 48 hours, with continuous removal of the water formed in the reaction. The mixture is then cooled, washed with sodium bicarbonate solution and with water, dried over magnesium sulfate, and concentrated to give a residue of 1-adamantanecarboxylic acid, diester with 2,2,9,9-tetramethyl-1,10-decanediol; m.p. 83° C. following crystallization from acetonitrile.

J. A mixture of 4.9 g. of 2,2,9,9-tetramethyl-1,10-decanediol, 10.3 g. of L-phenylalanyl chloride hydrochloride, and 80 ml. of ethyl acetate is stirred at room temperature for 24 hours. The insoluble product is collected on a filter and dissolved in 100 ml. of water. This aqueous solution is washed with ether, treated with 4.6 g. of sodium bicarbonate, and extracted with ethyl acetate. The ethyl acetate extract is dried over magnesium sulfate and concentrated to dryness in vacuo. The residue is dissolved in 150 ml. of ether and treated with 3.8 ml. of concentrated hydrochloric acid. The resulting mixture is stirred for 15 minutes and the insoluble product is collected on a filter, washed with ether and petroleum ether, and dried. It is 3-phenyl-L-alanine, diester with 2,2,9,9-tetramethyl-1,10-decanediol, dihydrochloride; m.p. 188°–189° C. The free base is obtained by dissolving the dihydrochloride in water, adding sodium bicarbonate, and extracting with ether.

K. At 0° C., 21.5 g. of diphenylphosphorochloridate, $(C_6H_5O)_2POCl$, is added to a solution of 6.9 g. of 2,2,9,9-tetramethyl-1,10-decanediol in 25 ml. of dry pyridine. The mixture is stirred for 30 minutes more and held overnight at 0°–5° C. A few drops of water are added and the mixture is concentrated to dryness in vacuo. The residue is dissolved in benzene and the solution washed with water, with 1 N hydrochloric acid, with water until neutral, with 1 M potassium bicarbonate, and again with water. The benzene solution is dried and evaporated to give a residue of diphenylphosphoric acid, diester with 2,2,9,9-tetramethyl-1,10-decanediol. A mixture of 11.2 g. of this product, 3 g. of platinum oxide catalyst, and 250 ml. of acetic acid at room temperature is shaken with hydrogen at 500 pounds per square inch pressure until hydrogen uptake ceases. The catalyst is removed by filtration and the filtrate is concentrated to give a residue of phosphoric acid, diester with 2,2,9,9-tetramethyl-1,10-decanediol; m.p. 160°–162° C. following trituration with ether and with petroleum ether. The disodium salt is obtained by dissolving 3.0 g. of the above product and 1.3 g. of sodium bicarbonate in 100 ml. of water and freeze-drying.

I claim:

1. A pharmaceutical composition in dosage unit form possessing serum triglyceride-lowering activity, serum cholesterol lowering activity and suitable for internal administration, comprising a pharmaceutical carrier and 20 to 5,000 mg. per dosage unit of a compound of the formula

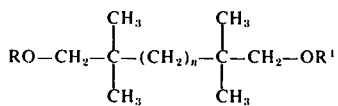

where $n$ is 6, 7, 8, 9, or 10; and R and R¹ are selected from the group consisting of hydrogen, acyl radicals of hydrocarbon monocarboxylic acids containing 1 to 12 carbon atoms, acyl radicals of hydrocarbon dicarboxylic acids containing 4 to 6 carbon atoms, phenylalanyl, and phosphono.

2. The composition of claim 1 suitable for oral administration and having 20 to 1,000 mg. per dosage unit of said compound of claim 1.

3. The composition of claim 1 suitable for parenteral administration.

4. The composition of claim 1 in the form of a capsule or tablet for oral administration in which the compound of the indicated formula is 2,2,9,9-tetramethyl-1,10-decanediol.

5. The composition of claim 4 containing 200 mg. of 2,2,9,9-tetramethyl-1,10-decanediol per dosage unit.

6. A method for lowering elevated serum triglyceride levels which comprises administering a compound of the formula

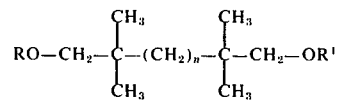

orally or parenterally in humans in a dose of from 1,000 to 5,000 mg. per day; where $n$ is 6, 7, 8, 9, or 10; and R and R¹ are selected from the group consisting of hydrogen, acyl radicals of hydrocarbon monocarboxylic acids containing 1 to 12 carbon atoms, acyl radicals of hydrocarbon dicarboxylic acids containing 4 to 6 carbon atoms, phenylalanyl, and phosphono.

7. The method of claim 6 wherein 2,2,9,9-tetramethyl-1,10-decanediol is administered.

8. The method of claim 7 wherein the administration is oral.

9. A method for lowering elevated serum cholesterol levels which comprises administering a compound of the formula

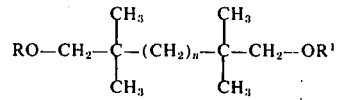

orally or parenterally in humans in a dose of from 1,000 to 5,000 mg. per day; where $n$ is 6, 7, 8, 9, and 10; and R and R¹ are selected from the group consisting of hydrogen, acyl radicals of hydrocarbon monocarboxylic acids containing 1 to 12 carbon atoms, acyl radicals of hydrocarbon dicarboxylic acids containing 4 to 6 carbon atoms, phenylalanyl, and phosphono.

10. The method of claim 9 wherein 2,2,9,9-tetramethyl-1,10-decanediol is administered.

11. The method of claim 10 wherein the administration is oral.

* * * * *